(12) United States Patent
Park

(10) Patent No.: US 9,880,588 B2
(45) Date of Patent: Jan. 30, 2018

(54) VARIABLY DEFORMABLE DISPLAY DEVICE WITH CLICK BUTTON MODULE

(71) Applicant: SAMSUNG DISPLAY CO., LTD., Yongin, Gyeonggi-Do (KR)

(72) Inventor: Chang Min Park, Gwangmyeong-si (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 250 days.

(21) Appl. No.: 14/806,980

(22) Filed: Jul. 23, 2015

(65) Prior Publication Data

US 2016/0209876 A1     Jul. 21, 2016

(30) Foreign Application Priority Data

Jan. 15, 2015  (KR) .......................... 10-2015-0007460

(51) Int. Cl.
| | | |
|---|---|---|
| G06F 1/16 | (2006.01) | |
| G06F 3/02 | (2006.01) | |
| G06F 3/0354 | (2013.01) | |
| H04M 1/23 | (2006.01) | |

(52) U.S. Cl.
CPC ............ G06F 1/1652 (2013.01); G06F 1/163 (2013.01); G06F 1/1684 (2013.01); G06F 3/0213 (2013.01); G06F 3/0227 (2013.01); G06F 3/03547 (2013.01); H04M 1/236 (2013.01); G06F 2203/04105 (2013.01); H04M 2250/22 (2013.01)

(58) Field of Classification Search
None
See application file for complete search history.

(56) References Cited

U.S. PATENT DOCUMENTS

| | | | |
|---|---|---|---|
| 6,683,265 B2 * | 1/2004 | Masuda ................. | H01H 13/48 200/406 |
| 8,263,889 B2 * | 9/2012 | Takahashi ............... | H01H 1/10 200/512 |
| 2004/0129547 A1 * | 7/2004 | Tomitsuka .......... | H01H 13/7006 200/513 |
| 2007/0029172 A1 * | 2/2007 | Choi ..................... | G06F 1/1626 200/1 B |
| 2008/0018607 A1 * | 1/2008 | Joo ......................... | H04M 1/23 345/169 |
| 2008/0296141 A1 * | 12/2008 | Ogatsu ................. | H01H 13/705 200/535 |
| 2009/0008234 A1 * | 1/2009 | Tolbert ................. | H01H 13/702 200/600 |

(Continued)

FOREIGN PATENT DOCUMENTS

| | | |
|---|---|---|
| JP | 09-017278 | 1/1997 |
| JP | 2000-250709 | 9/2000 |

(Continued)

*Primary Examiner* — Kent Chang
*Assistant Examiner* — Nathan Brittingham
(74) *Attorney, Agent, or Firm* — Lee & Morse, P.C.

(57) ABSTRACT

There is provided a variable display device including: a variable display displaying an image and variably changed by external force; and at least one click button module provided separately from the variable display and attached onto the bottom of the variable display to correspond to a predetermined touch button region of the variable display.

13 Claims, 10 Drawing Sheets

(56) References Cited

U.S. PATENT DOCUMENTS

| | | | | |
|---|---|---|---|---|
| 2009/0103250 A1* | 4/2009 | Takashima | ............... | H05K 9/00 361/679.02 |
| 2009/0153469 A1* | 6/2009 | Wang | ................... | G06F 3/0338 345/156 |
| 2011/0186414 A1* | 8/2011 | Kim | ........................ | H01H 1/10 200/512 |
| 2012/0154134 A1* | 6/2012 | Lim | ........................ | G06F 3/016 340/407.2 |
| 2012/0242684 A1* | 9/2012 | Kim | ..................... | G06F 3/0481 345/619 |
| 2013/0087443 A1* | 4/2013 | Kikuchi | ................. | H01H 13/48 200/520 |
| 2014/0157203 A1 | 6/2014 | Jeon et al. | | |
| 2014/0168063 A1* | 6/2014 | Kita | ........................ | G06F 3/017 345/156 |
| 2014/0240108 A1* | 8/2014 | Matthews | ................ | G08B 6/00 340/407.1 |
| 2014/0362020 A1* | 12/2014 | Rothkopf | .............. | G06F 1/1652 345/173 |
| 2015/0022438 A1* | 1/2015 | Hong | .................. | H04M 1/7253 345/156 |
| 2015/0071510 A1* | 3/2015 | Kim | ...................... | G06K 9/0002 382/124 |
| 2015/0141084 A1* | 5/2015 | Kim | ...................... | H04M 1/236 455/575.1 |
| 2015/0221460 A1* | 8/2015 | Teplitxky | ............... | H01H 13/06 200/302.2 |
| 2016/0277555 A1* | 9/2016 | Lee | ....................... | H04M 1/236 |
| 2016/0342327 A1* | 11/2016 | Chi | ........................ | H04M 1/05 |
| 2016/0349790 A1* | 12/2016 | Connor | ................. | G06F 1/1694 |

FOREIGN PATENT DOCUMENTS

| | | | | |
|---|---|---|---|---|
| JP | 2007-036492 | | 2/2007 | |
| KR | 10-2010-0034758 A | | 4/2010 | |
| WO | WO 2013/13203 A2 * | | 1/2013 | ............. H04M 1/05 |
| WO | WO2014/175513 A1 * | | 10/2014 | ............... H04B 1/40 |
| WO | WO 2015/049715 A1 * | | 4/2015 | ........... G06F 3/0482 |

* cited by examiner

US 9,880,588 B2

VARIABLY DEFORMABLE DISPLAY DEVICE WITH CLICK BUTTON MODULE

CROSS-REFERENCE TO RELATED APPLICATION

Korean Patent Application No. 10-2015-0007460, filed on Jan. 15, 2015, in the Korean Intellectual Property Office, and entitled: "Variable Display Device," is incorporated by reference herein in its entirety.

BACKGROUND

1. Field

Embodiments relate to a display device, and more particularly, to a variable display device that can be changed into various shapes by external force.

2. Description of the Related Art

A display device is a device displaying images. Recently, a variable display device that has variability such as flexible, foldable or bendable, rollable, and stretchable in at least one direction and can be deformed into various shapes has received attention.

SUMMARY

Embodiments are directed to a variable display device including a variable display that displays an image and that is variably deformable by an external force, and at least one click button module provided separately from the variable display and attached onto a bottom side of the variable display to correspond to a predetermined touch button region of the variable display.

The click button module may include an actuator housing attached onto the bottom side of the variable display, the actuator housing being press-deformable together with the touch button region of the variable display, a metal dome switch located below the actuator housing, the metal dome switch being pressable and elastically deformable by the actuator housing, and a support plate located below the metal dome switch to support the metal dome switch and input a signal through the metal dome switch.

The actuator housing includes an actuator in a form of a protrusion that presses the metal dome switch when the click button module is pressed.

The metal dome switch may include a metal dome sheet fixed to the support plate and having a dome shape contacting the actuator, and a switch electrode located on a lower surface of the metal dome sheet.

The support plate may include a rigid PCB having a touch electrode that contacts the switch electrode when the click button module is pressed.

An upper surface of the actuator housing may be flatly attached onto the bottom end of the variable display.

Embodiments are also directed to a variable display device including a variable display that displays an image and that is variably deformable by external force, and at least one click button module attached onto a bottom side of the variable display to correspond to a predetermined touch button region of the variable display. The click button module may include a protrusion that protrudes convexly into the touch button region. The touch button region may include a protruding surface that is protruded convexly upward by the protrusion of the click button module.

A display area of the variable display may include a front region and a side region. The protruding surface may be located in at least one of the front region and side region.

The protruding surface may be located in the side region.

The click button module may include an actuator housing attached onto the bottom of the touch button region, the actuator including the protrusion, and being press-deformable together with the protruding surface of the touch button region through the protrusion, a metal dome switch located below the actuator housing, the metal dome switch being pressable and elastically deformable by the actuator housing, and a support plate located below the metal dome switch to support the metal dome switch and input a signal through the metal dome switch.

The actuator in a form of the protrusion may integrally protrude from a lower surface of the actuator housing and may press the metal dome switch.

The metal dome switch may include a metal dome sheet fixed to the support plate and having a dome shape contacting the actuator, and a switch electrode on the lower surface of the metal dome sheet.

The support plate may include a rigid PCB having a touch electrode contacting the switch electrode.

The variable display may include a flexible display.

The variable display may include a stretchable display.

The variable display device may be a wearable device.

The variable display may include an organic light emitting element.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
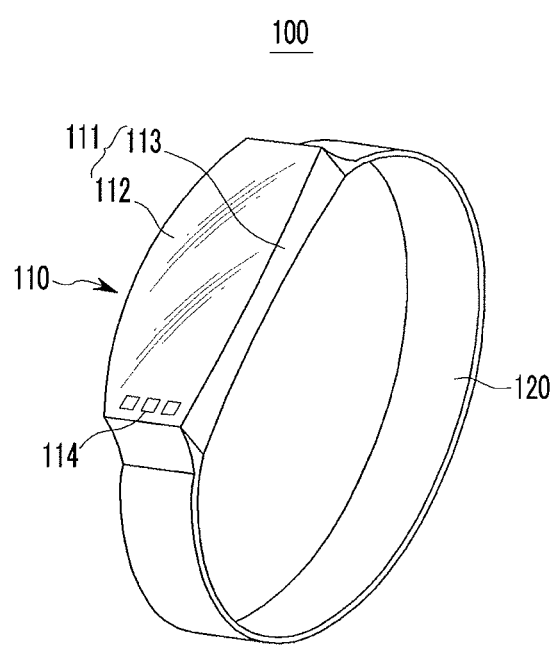
FIG. 1 illustrates a perspective view depicting an example of a variable display device according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

FIG. 1 illustrates a perspective view depicting an example of a variable display device according to an embodiment.

Referring to FIG. 1, a variable display device 100 according to an embodiment may be configured as a wearable device which may be worn on a user's body. For example, the wearable device may be mounted on the user's wrist or forearm to display an image to the user.

Figure 2:
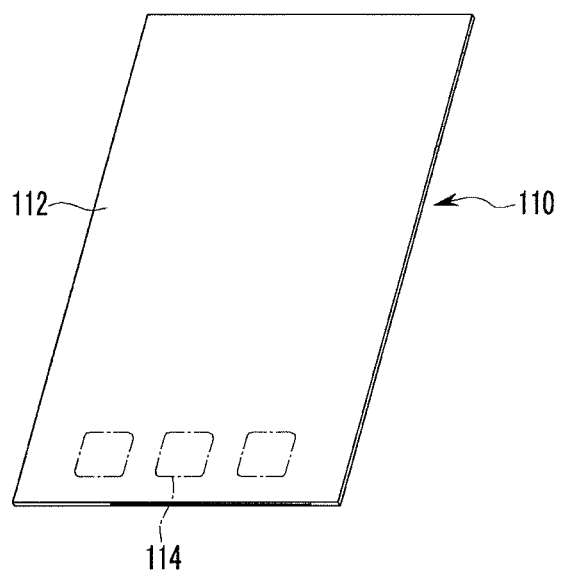
FIG. 2 illustrates a diagram of a front portion of a variable display applied to the variable display device according to the embodiment.
Figure 3:
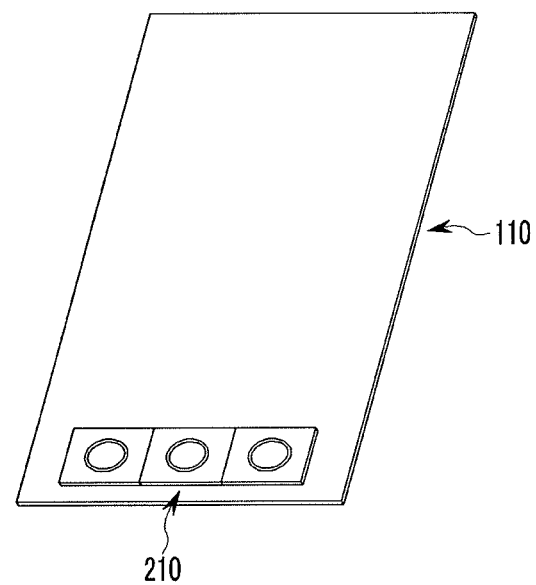
FIG. 3 illustrates a diagram of a bottom portion of the variable display applied to the variable display device according to the embodiment.

FIG. 2 illustrates a diagram of a front portion of a variable display applied to the variable display device 100 according to the embodiment. FIG. 3 illustrates a diagram of a bottom portion of the variable display applied to the variable display device according to the embodiment.

Referring to FIGS. 1 to 3, the variable display device 100 may include a variable display 110 and a click button module 210. The configuration of the variable display 110 and the click button module 210 will be described below in more detail.

The variable display device 100 may include a wearable band 120 that supports the variable display 110 and allows the variable display 110 to be worn on the user's wrist or forearm in order to be configured as a wearable device.

The variable display 110 displays an image. The variable display 110 may be made of a variable material that may be changed into various shapes by external pressure. For example, the variable display 110 may be flexible or bendable. The variable display 110 may include a variable display panel and a touch sensing layer.

The variable display panel may be manufactured by forming a plurality of pixels for displaying an image on a substrate having variability. For example, the variable display panel may display an image of a user interface (UI), a graphic user interface (GUI), or the like through the plurality of pixels.

The variable display panel may include a variable substrate that is made of a plastic material having excellent heat resistance, durability, and insulating property, such as polyethylene naphthalate (PEN), polycarbonate (PC), polyarylate (PAR), polyether imide (PEI), polyether sulfone (PES), polyimide (PI), poly(methylmethacrylate) (PMMA), and poly dimethyl siloxane (PDMS). The variable display panel include variable substrates made of other suitable materials having flexibility and elasticity.

The variable display panel may include an organic light emitting element. In other implementations, the variable display panel may include an electro luminescence (EL) element, a liquid crystal display (LCD) element, or the like. The variable display panel may use various configurations and driving methods.

The variable display panel may be flexible, stretchable, bendable, or rollable. For example, the variable display 110 according to the embodiment may be a flexible display including a flexible variable display panel, and/or may be a stretchable display including a stretchable variable display panel.

The touch sensing layer may be disposed on the variable display panel. The touch sensing layer may be attached onto the variable display panel by a pressure sensitive adhesive (PSA).

The touch sensing layer may sense a touch. The touch sensing layer may sense the touch when an object actually approaches or contacts the touch sensing layer. Here, the touch includes not only a direct contact where an external object such as a user's hand directly contacts the touch sensing layer but also a case where the external object approaches the touch sensing layer or hovers while approaching the touch sensing layer.

The touch sensing layer may be integrally formed inside the variable display panel. A cover window for protecting the variable display panel and the touch sensing layer from external force and an external contamination material may be disposed on the touch sensing layer. In addition, a lower protective film for preventing the variable display panel and the touch sensing layer from being damaged by absorbing an impact from the outside may be disposed on the bottom of the variable display panel.

The variable display 110 may include a front region 112 and a side region 113, as display areas 111 displaying the image, as illustrated in FIGS. 1 and 2. The variable display 110 may be made of a material having variability to form the display area 111 extending from the front region 112 to the side region 113. The front region 112 may include one or more touch button regions 114. The touch button region 114 may form a position-fixed touch button provided at a predetermined position in the front region 112 of the display area 111 of the variable display 110.

Figure 4:
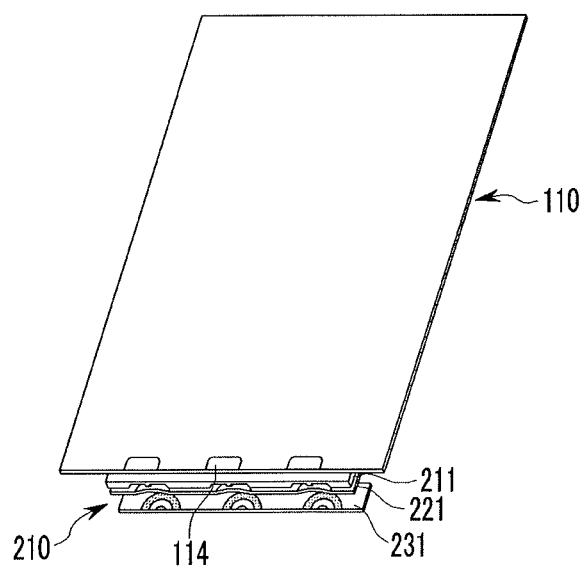
FIG. 4 illustrates an exploded diagram depicting a click button module applied to the variable display device according to the embodiment.
Figure 5:
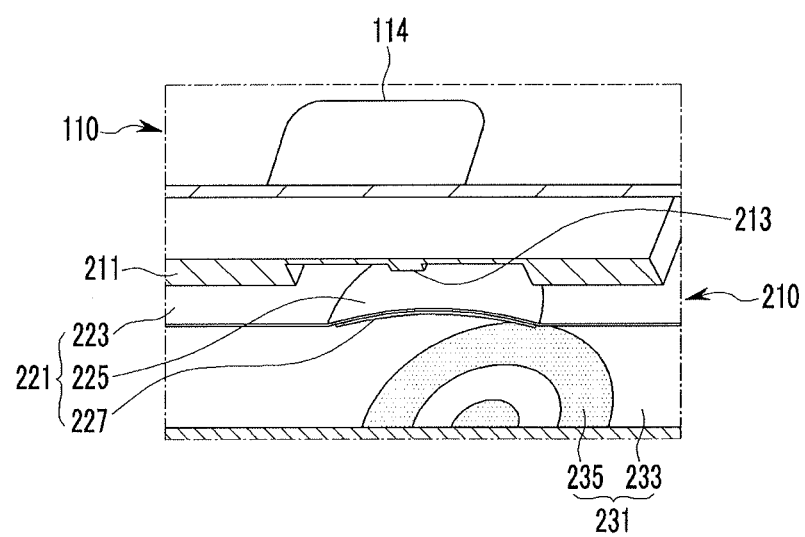
FIG. 5 illustrates an enlarged diagram depicting the click button module applied to the variable display device according to the embodiment.
Figure 6:
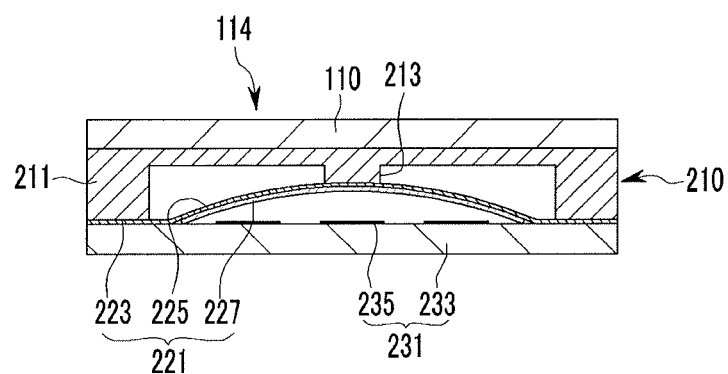
FIG. 6 illustrates an assembled cross-sectional view depicting the click button module applied to the variable display device according to the embodiment.

FIG. 4 illustrates an exploded diagram depicting a click button module applied to the variable display device according to the embodiment. FIG. 5 illustrates an enlarged diagram enlarging a main part of FIG. 4. FIG. 6 illustrates an assembled cross-sectional view of FIG. 4.

Referring to FIGS. 4 to 6, the click button module 210 according to the embodiment provides physical button click feeling to the user in addition to a touch feeling using the touch button region 114 of the variable display 110. The click button module 210 may provide a mechanical button click feeling in addition to simple touch feeling by using the variability of the variable display 110 in a touch key input method using the touch of the touch button region 114. When the click button module 210 requires dual signal input such as a double click, the click button module 210 may implement a switch signal input through a physical button click in addition to the touch signal input through the touch button region 114.

The click button module 210 may be provided as an input device that is connected to an electronic circuit (including, for example, a controller) of the variable display device 100 to input a signal to the electronic circuit. That is, the click button module 210 may provide a control signal to the electronic circuit when being pressed by the user's finger. The click button module 210 may be provided separately from the variable display 110. The click button module 210 may be attached onto the bottom side of the variable display 110 to correspond to the touch button region 114 of the variable display 110. The click button module 210 may be supported on a main body of the variable display device 100 while being attached onto the bottom end of the variable display 110. The click button module 210 may include one or more numbers to correspond to the touch button region 114 of the variable display 110. The click button module 210 may include an actuator housing 211, a metal dome switch 221, and a support plate 231.

The actuator housing 211 is press-deformed together with the touch button region 114 of the variable display 110. The actuator housing 211 may be press-deformed together with the touch button region 114 of the variable display 110, and may provide virtual pressure to the metal dome switch 221. The actuator housing 211 may be made of a press-deformable material, for example, a flexible material including plastic, rubber, and polyethylene terephthalate (PET). The actuator housing 211 may be attached onto the bottom of the variable display 110. The actuator housing 211 may be attached onto the bottom of the variable display 110 by a pressure sensitive adhesive (PSA). In this case, the upper surface of the actuator housing 211 may be flatly attached onto the bottom of the variable display 110. As a result, the touch button region 114 of the variable display 110 may form a plane like the upper surface of the actuator housing 211.

In addition, a grooved space that receives the metal dome switch 221 may be formed on the lower surface of the actuator housing 211, and an actuator 213 disposed in the grooved space may be integrally formed. The actuator 213 may press the metal dome switch 221. When the touch button region 114 of the variable display 110 is pressed by the user's finger, the actuator 213 may operate while moving toward the metal dome switch 221 together with the touch button region 114. The actuator 213 may be formed to protrude toward in a direction toward the lower side of the variable display device from the lower surface of the actuator housing 211. The actuator 213 may be provided in a form of a protrusion disposed in the grooved space.

The metal dome switch 221 may be a switch element having a switch dome shape for inputting the signal to the electronic circuit of the variable display device 100. The metal dome switch 221 may be mounted on the support plate 231 to be described below in detail. The metal dome switch 221 may provide physical click feeling to the user when being pressed by the user through the touch button region 114 of the variable display 110 and the actuator housing 211. The metal dome switch 221 may be disposed below the actuator housing 211 and pressed by the actuator 213 of the actuator housing 211 to be elastically deformed.

The metal dome switch 221 may include a metal dome sheet 223 and a switch electrode 227. The metal dome sheet 223 may be made of a metal material having elasticity. The metal dome sheet 223 may be fixed to the upper surface of the support plate 231. The metal dome sheet 223 may be attached onto the upper surface of the support plate 231 and the lower surface of a space edge of the actuator housing 211 by a pressure sensitive adhesive (PSA). The metal dome sheet 223 may include a dome-shaped metal dome 225 that contacts the actuator 213 of the actuator housing 211. The metal dome 225 may be formed in a shape that protrudes convexly upward from the upper surface of the support plate 231. The metal dome 225 may receive elastic force from the actuator 213 and may be pressed toward the support plate 231. The switch electrode 227 may be formed with a switch electrode pattern on the lower surface of the metal dome 225 of the metal dome sheet 223. The switch electrode 227 may inter-contact the support plate 231 when the metal dome 225 is pressed toward the support plate 231 by the actuator 213.

The support plate 231 may substantially support the metal dome switch 221. The support plate 231 may be a support structure supporting the metal dome switch 221 and supported on the main body of the variable display device 100. The support plate 231 is disposed below the metal dome switch 221, and may be attached onto the metal dome sheet 223 of the metal dome switch 221. The support plate 231 may be attached to the edge region of the metal dome 225 of the metal dome sheet 223. The support plate 231 may contact the switch electrode 227 of the metal dome 225 when the metal dome 225 is pressed by the actuator 213 and may support the metal dome 225.

In the embodiment, the support plate 231 may contact the switch electrode 227 of the metal dome 225 and may input the control signal to the electronic circuit of the variable display device 100. The support plate 231 may be configured as a PCB 233 made of a rigid material so as to support the metal dome 225, contact the switch electrode 227 of the metal dome 225, and input the signal to the electronic circuit of the variable display device 100. In the PCB 233, a touch electrode 235 contacting the switch electrode 227 of the metal dome 225 may be formed. The touch electrode 235 may be formed with an electrode pattern on the upper surface of the PCB 233.

Hereinafter, an operation of the variable display device 100 according to the embodiment configured above will be described in detail with reference to the above-illustrated drawings and accompanying drawings.

Figure 7:
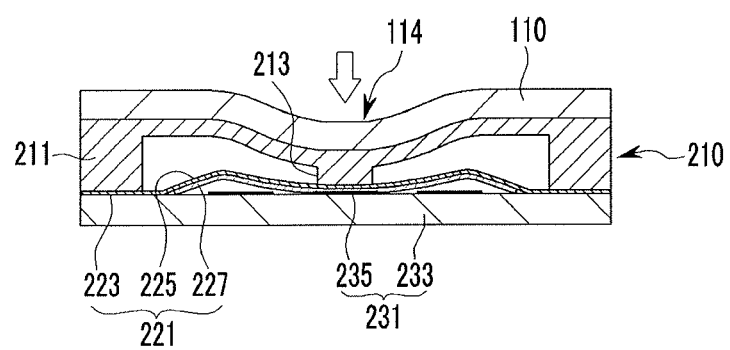
FIG. 7 illustrates a diagram for describing an operation of the click button module applied to the variable display device according to the embodiment.

FIG. 7 illustrates a diagram for describing an operation of the click button module applied to the variable display device according to the embodiment.

Referring to FIGS. 1 and 7, the touch button region 114 in the front region 112 of the display area 111 may be pressed in the display area 111 of the variable display 110.

Information regarding a touch by the hand may be transmitted to an external device, that is, an electronic circuit such as a controller through the touch sensing layer of the touch button region 114. The external device may transmit an image signal or the like to the variable display device 100 based on the touch information.

The actuator housing 211 of the click button module 210 may be press-deformed together with the touch button region 114 of the variable display 110. As a result, the actuator 213 of the actuator housing 211 may move toward the metal dome 225 of the metal dome sheet 223 to press the metal dome 225. The metal dome 225 may receive the elastic force from the actuator 213 and may be pressed toward the support plate 231.

Accordingly, in the embodiment, when the touch button region 114 of the variable display 110 is pressed, the touch button region 114 may be press-deformed together with the actuator housing 211 by variability of the variable display 110. The embodiment may provide a physical button click feeling to the user while the metal dome 225 of the metal dome switch 221 is elastically deformed by the actuator 213 of the actuator housing 211.

The embodiment may provide mechanical button click feeling in addition to a simple touch feeling to the user by using variability of the variable display 110 in the touch key input method through the touch of the touch button region 114.

As a result, the embodiment may enhance user's experience and improve the emotional quality of the variable display device 100 by providing button click feeling in addition to an operation by the simple touch of the touch button region 114.

When the metal dome 225 is pressed toward the support plate 231 by the actuator 213, the support plate 231 may contact the switch electrode 227 of the metal dome 225 and may support the metal dome 225. The switch electrode 227 of the metal dome 225 may contact the touch electrode 235 of the support plate 231 formed by the PCB 233.

As a result, the switch electrode 227 of the metal dome 225 may contact the touch electrode 235 of the PCB 233. Thus, in the embodiment, a control signal such as information or commands may be input to the electronic circuit of the variable display device 100 by a button switch method.

When the dual signal input such as a double click is desired, the switch signal by the dome switch button of the click button module 210 in addition to the touch signal through the touch button region 114 may be input to the electronic circuit.

As a result, in the embodiment, it may be possible to easily implement a double click in a mobile devices and the like by simultaneously applying touch sensing and switch buttons of the variable display 110.

It may also be possible to minimize an increase in thickness of the entire variable display device 100 by attaching a relatively slim click button module 210 having a metal dome switch type onto the bottom of the variable display 110.

Figure 8:
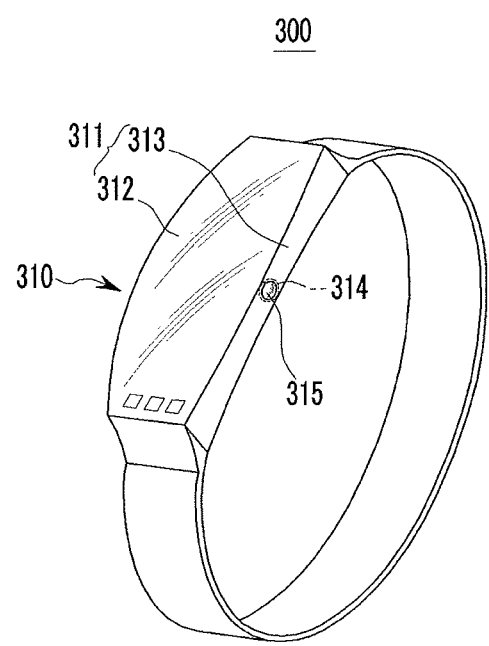
FIG. 8 illustrates a perspective view depicting an example of a variable display device according to another embodiment.
Figure 9:
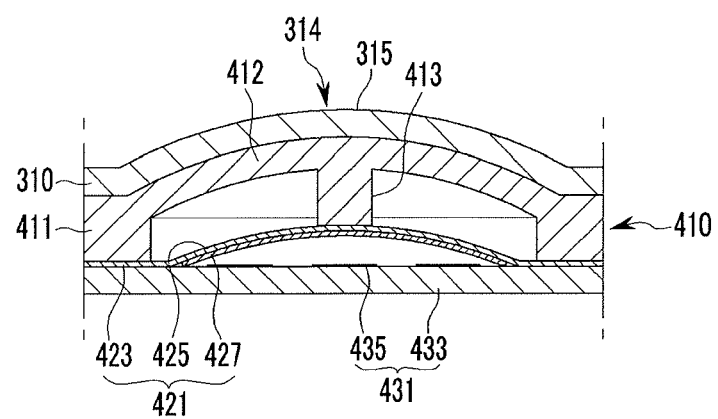
FIG. 9 illustrates a cross-sectional view depicting a click button module applied to the variable display device according to another embodiment.

FIG. 8 illustrates a perspective view depicting an example of a variable display device according to another embodiment. FIG. 9 illustrates a cross-sectional view depicting a click button module applied to the variable display device according to the embodiment illustrated in FIG. 8.

Referring to FIGS. 8 and 9, a variable display device 300 according to this embodiment may be based on the configuration of the wearable device according to the previous embodiment, and a click button module 410 convexly protruding to a display area 311 of a variable display 310 may be configured.

The variable display 310 may include a front region 312 and a side region 313, as the display area 311 displaying an image. The variable display 310 may be made of a material having variability to form the display area 311 extending from the front region 313 to the side region 113. In this case, the click button module 410 may be configured as a side button in the side region 313 of the display area 311.

The variable display 310 may include a flexible display that is flexible or a stretchable display that is stretchable. For example, the variable display 310 may include the stretchable display.

The variable display 310 may be provided as a stretchable display to prevent or reduce the likelihood of damage due to repeated pressing on the protruding portion of the display area 311 when the click button module 410 is configured to convexly protrude into the display area 311 of the flexible display.

The variable display 310 may include a touch button region 314 in the side region 313 of the display area 311. The click button module 410 may be attached onto the bottom of the variable display 310 to correspond to the touch button region 314 of the side region 313. The click button module 410 may include a protrusion 412 that convexly protrudes to the touch button region 314. As a result, in the side region 313 of the variable display 310, the touch button region 314 may have a protruding surface 315 convexly protruding upward in accordance with the protrusion 412 of the click button module 410.

If the protruding surface 315 protruding by the protrusion 412 of the click button module 410 were to be configured in the front region 312 of the variable display 310, the protruding surface 315 of the protrusion 412 could be be abraded by an external object.

The click button module 410 may include an actuator housing 411, a metal dome switch 421, and a support plate 431.

The actuator housing 411 may be attached onto the bottom of the touch button region 314 in the side region 313 of the variable display 310. The actuator housing 411 may form a convex protrusion 412, and may be press-deformable together with the protruding surface 315 of the touch button region 314 by the convex protrusion 412. In this case, the protruding surface 315 of the touch button region 314 and the upper surface of the protrusion 412 have corresponding convex shapes and may be adhered to each other by a pressure sensitive adhesive (PSA).

In addition, a grooved space receiving the metal dome switch 421 may be formed on the lower surface of the protrusion 412 of the actuator housing 411. An actuator 413 disposed in the grooved space may be integrally formed. The actuator 413 may press the metal dome switch 421. When the touch button region 314 of the side region 313 is pressed by a user's finger, the actuator 213 may operate by moving toward the metal dome switch 421 together with the touch button region 314. The actuator 413 may be formed to protrude in a direction toward a lower side of the click button module from the lower surface of the protrusion 412 of the actuator housing 411 and may be provided in a form of a protrusion disposed in the grooved space.

The metal dome switch 421 may include a metal dome sheet 423, a metal dome 425, and a switch electrode 427 which may be the same as those of the embodiment illustrated in FIGS. 4-7. Accordingly, the detailed description thereof will not be repeated. In addition, the support plate 431 may include a rigid PCB 433 and a touch electrode 435 is included in the PCB 433, as in the above embodiment. Accordingly, a detailed description thereof will not be repeated.

Hereinafter, an operation of the variable display device 300 according to the present embodiment, which is configured as described above will be described in detail with reference to the above-illustrated drawings and the accompanying drawing.

Figure 10:
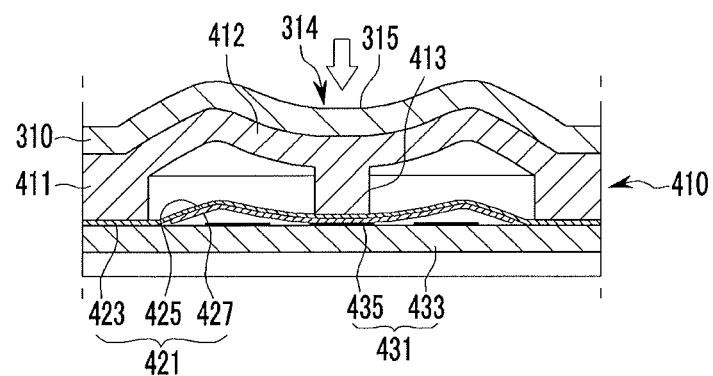
FIG. 10 illustrates a diagram for describing an operation of the click button module applied to the variable display device according to the embodiment illustrated in FIG. 9.

FIG. 10 illustrates a diagram for describing an operation of the click button module applied to the variable display device according to the present embodiment.

Referring to FIGS. 8 and 10, in the display area 311 of the variable display 310, the protruding surface 315 convexly protruding to the touch button region 314 of the side region 313 and the protrusion 412 of the click button module 410 may be pressed.

Then, information regarding a touch by the hand may be transmitted to an external device, for example, an electronic circuit such as a controller, through the touch sensing layer of the touch button region 314, and the external device may transmit an image signal or the like to the variable display device 300 based on the touch information.

The protrusion 412 of the actuator housing 411 may be press-deformed together with the protruding surface 315 of the touch button region 314. As a result, the actuator 413 of the actuator housing 411 may move toward the metal dome 425 of the metal dome sheet 423 to press the metal dome 425. The metal dome 425 may receive the elastic force transmitted by the actuator 413 and may be pressed toward the support plate 431.

When the metal dome 425 is pressed toward the support plate 431 by the actuator 413, the support plate 431 may contact the switch electrode 427 of the metal dome 425 and may support the metal dome 425. The switch electrode 427 of the metal dome 425 may contact the touch electrode 435 of the support plate 431 formed by the PCB 433.

As a result, the switch electrode 427 of the metal dome 425 may contact the touch electrode 435 of the PCB 433. A control signal, such as information or commands, may be input to the electronic circuit of the variable display device 300 by a button switch method.

Accordingly, in the variable display device 300 according to the present embodiment, the protruding surface 315 convexly protruding into the touch button region 314 may be configured in the side region 313 of the display area 311. The click button module 410 having the protrusion 412 may be configured on the bottom of the protruding surface 315.

As a result, in the present embodiment, it may be possible to enhance a user's experience by visible button recognition of the dome switch which protrudes to the side region 313 of the display area 311.

Furthermore, in the variable display device 300 according to the present embodiment, the display area 311 of the variable display 310 may extend from the front region 312 to the side region 313 and a protruding side button may be configured at the side region 313. Accordingly, to the variable display 310 may be used for manufacturing a mobile device or the like to maximize characteristics of the variable display 310.

Other configurations, operations, and effects of the variable display device 300 according to the present embodiment are may be same as those of the above embodiment. Accordingly, the detailed description thereof will not be repeated.

By way of summation and review, the shape of a variable display device may be changed in various ways such that the variable display device may be used in various uses. For example, the variable display device may be implemented by portable devices such as a tablet PC and a mobile phone and wearable devices.

The display device may provide a touch sensing function in which interaction with a viewer may be performed, in addition to a function of displaying an image. The touch sensing function may determine touch information as to whether a touch by a user exists and a touch position, or the like, when the user approaches or contacts a display area by using a finger, a touch pen, or the like. The variable display device may receive an image signal based on the touch information to display an image.

However, the display device using a touch key input method based on a simple touch using a touch button in the display area provides only a touch feeling to the user.

Embodiments advance the art by providing a variable display device having advantages of implementing physical button click feeling in addition to simple touch feeling in a touch key input method using a touch button.

According to the embodiment, it may be possible to enhance a user's experience and improve emotional quality by providing button click feeling in addition to an operation by a simple touch of a touch button region.

Further, it may be possible to easily implement a double click for a dual signal input by simultaneously applying touch sensing and switch buttons of the variable display.

Further, it may be possible to minimize an increase in thickness by attaching a relatively slim click button module having a metal dome switch type onto the bottom of the variable display.

Further, it may be possible to further enhance user's experience by visible button recognition of a dome switch which protrudes to a side region of the display area.

Further, the display area of the variable display may extend from a front region to the side region and a protruding side button is configured at the side region. Accordingly, in manufacturing a mobile device, it is possible to maximize characteristics of the variable display.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A variable display device, comprising:
a variable display that displays an image and that is variably deformable by an external force; and
at least one click button module attached onto a bottom side of the variable display to correspond to a predetermined touch button region of the variable display, the bottom side of the variable display being a side opposite a side of the variable display that displays the image,
wherein the click button module includes:
an actuator housing directly attached onto the bottom side of the variable display, the actuator housing being press-deformable together with the touch button region of the variable display,
a metal dome switch located below the actuator housing, wherein the actuator housing includes an actuator in a form of a protrusion that presses the metal dome switch when the click button module is pressed, the metal dome switch being elastically deformable when pressed by the protrusion, and
a support plate located below the metal dome switch to support the metal dome switch and input a signal through the metal dome switch.

2. The variable display device as claimed in claim 1, wherein:
the metal dome switch includes:
a metal dome sheet fixed to the support plate and having a dome shape contacting the actuator, and
a switch electrode located on a lower surface of the metal dome sheet.

3. The variable display device as claimed in claim 2, wherein:
the support plate includes a rigid PCB having a touch electrode that contacts the switch electrode when the click button module is pressed.

4. The variable display device as claimed in claim 1, wherein:
an upper surface of the actuator housing is flatly attached onto the bottom end of the variable display.

5. A variable display device, comprising:
a variable display that displays an image and that is variably deformable by external force; and
at least one click button module attached onto a bottom side of the variable display to correspond to a predetermined touch button region of the variable display, the bottom side of the variable display being a side opposite a side of the variable display that displays the image, wherein:
the click button module includes an actuator housing directly attached onto the bottom side of the variable display in the touch button region, and a metal dome switch located below the actuator housing, the metal dome switch being pressable and elastically deformable by the actuator housing, the actuator housing further including:
a protrusion that protrudes convexly into the touch button region such that the variable display in the touch button region includes a protruding surface that protrudes convexly upward by the protrusion of the click button module, and an actuator that integrally protrudes from a lower surface of the actuator housing, wherein, the actuator housing is press-deformable together with the protruding surface of the variable display in the touch button region and the click button module further includes:

a metal dome switch located below the actuator housing, the metal dome switch being pressable and elastically deformable by the actuator housing, and a support plate located below the metal dome switch to support the metal dome switch and input a signal through the metal dome switch, wherein, the actuator presses the metal dome switch.

6. The variable display device as claimed in claim 5, wherein:

a display area of the variable display includes a front region and a side region, and the protruding surface is located in at least one of the front region and side region.

7. The variable display device as claimed in claim 6, wherein:

the protruding surface is located in the side region.

8. The variable display device as claimed in claim 5, wherein:

the metal dome switch includes:
  a metal dome sheet fixed to the support plate and having a dome shape contacting the actuator, and
  a switch electrode on the lower surface of the metal dome sheet.

9. The variable display device as claimed in claim 8, wherein:

the support plate includes a rigid PCB having a touch electrode contacting the switch electrode.

10. The variable display device as claimed in claim 1, wherein:

the variable display includes a flexible display.

11. The variable display device as claimed in claim 1, wherein:

the variable display includes a stretchable display.

12. The variable display device as claimed in claim 1, wherein:

the variable display device is a wearable device.

13. The variable display device as claimed in claim 1, wherein:

the variable display includes an organic light emitting element.

* * * * *